United States Patent [19]

Ribba

[11] Patent Number: 4,800,220

[45] Date of Patent: Jan. 24, 1989

[54] CROSSLINKED CARBOXYLIC COPOLYMERS USABLE AS THICKENERS IN AQUEOUS MEDIA AND PREPARATION THEREOF

[75] Inventor: Alain Ribba, Crotelles, France

[73] Assignee: Manufacture de Produits Chimiques Protex, Paris, France

[21] Appl. No.: 124,945

[22] PCT Filed: Mar. 13, 1987

[86] PCT No.: PCT/FR87/00072

§ 371 Date: Nov. 2, 1987

§ 102(e) Date: Nov. 2, 1987

[87] PCT Pub. No.: WO87/05611

PCT Pub. Date: Sep. 24, 1987

[30] Foreign Application Priority Data

Mar. 14, 1986 [FR] France .................. 86 03655

[51] Int. Cl.[4] .......................... C08F 1/00; C08F 34/02
[52] U.S. Cl. ........................ 526/238.23; 526/271; 526/318.42; 526/932
[58] Field of Search ............... 526/271, 318.42, 932, 526/238.23

[56] References Cited

U.S. PATENT DOCUMENTS

| | | | |
|---|---|---|---|
| 2,892,820 | 6/1959 | Stewart et al. | 526/271 |
| 2,894,921 | 7/1959 | Jones | 526/271 |
| 2,985,625 | 5/1961 | Jones | 526/271 |
| 2,985,631 | 5/1961 | Jones | 526/271 |
| 3,137,660 | 6/1964 | Jones | 526/271 |
| 3,988,305 | 10/1976 | Stol et al. | 526/79 |
| 4,044,196 | 8/1977 | Huper et al. | 526/271 |
| 4,190,562 | 2/1986 | Westerman | 526/238.23 |

FOREIGN PATENT DOCUMENTS 58-13608  1/1983  Japan .................. 526/271

*Primary Examiner*—Joseph L. Schofer
*Assistant Examiner*—N. Sarofim
*Attorney, Agent, or Firm*—Watson, Cole, Grindle & Watson

[57] ABSTRACT

The invention relates to the chemistry of polymers and to cross-linked carboxylic copolymers obtained by copolymerization of an unsaturated carboxylic monomer, a cross-linking agent, an acrylic or methacrylic acid ester with a polyalkylene glycol and, optionally, an alkyl acrylate or methacrylate. Utilization as thickeners, particularly of media containing dissolved salts.

15 Claims, No Drawings

CROSSLINKED CARBOXYLIC COPOLYMERS USABLE AS THICKENERS IN AQUEOUS MEDIA AND PREPARATION THEREOF

The present invention relates to new crosslinked carboxylic copolymers usable as thickeners in aqueous media, and to their preparation.

Products capable of dissolving in water while swelling and capable of acting as thickeners find many applications in the textile, papermaking, pharmaceutical, cosmetics, oil, food processing or other industries. Among the products employed for this purpose, those most commonly employed are synthetic carboxylic polymers obtained from unsaturated carboxylic monomers. The carboxylic polymers may be homopolymers of an unsaturated and polymerizable carboxylic monomer such as acrylic acid, methacrylic acid, maleic anhydride, itaconic acid, and the like, or copolymers of such monomers. The thickening action of these polymers is produced by a crosslinking operation employing, as crosslinking agents, various polyfunctional compounds described in many patents, in concentrations of 0.1 to 10%. Such carboxylic polymers are described, for example, in French Pat. Nos. 2,131,128 and 2,281,389, U.S. Pat. Nos. 2,798,053, 2,985,625 and 2,958,679, British Pat. Nos. 80 0011 and 1,090,294, and Federal German Pat. Nos. 1,103,585, 1,138,225 and 2,017,451.

Other carboxylic polymers are also known, such as those described in U.S. Pat. Nos. 3,915,921 and 3,940,351, which are copolymers of unsaturated carboxylic acid, of a crosslinking agent and of at least one alkyl acrylate or methacrylate ester in which the alkyl radical contains from 10 to 30 carbon atoms. U.S. Pat. No. 4,062,817 also discloses other carboxylic polymers of this kind, which are copolymers of unsaturated carboxylic acid, of a crosslinking agent, of at least one alkyl acrylate or methacrylate ester in which the alkyl group contains 10 to 30 carbon atoms, and additionally of another alkyl acrylate or methacrylate ester in which the alkyl group contains 1 to 8 carbon atoms.

The carboxylic polymers described in all these patents are employed as thickeners in aqueous medium. They disperse or dissolve in water or in hydroalcoholic solvents, increasing the viscosity of the medium, the maximum increase in viscosity being reached after neutralization of the carboxylic groups with a base, such as aqueous ammonia, sodium hydroxide or an amine. Such properties are utilized in many applications. However, in some cases, carboxylic polymers are not wholly satisfactory, either in that the rheological properties are not sufficient, or in that the medium to be thickened contains dissolved salts, and this results in a considerable loss of the thickening properties of the carboxylic polymers, seen as a drop in the viscosity of the medium.

The objectives of the invention are to provide new crosslinked carboxylic copolymers giving improved rheological properties and having better resistance to dissolved salts, as well as a process for the preparation of these polymers.

More precisely, the invention relates to crosslinked carboxylic copolymers obtained by copolymerization of an unsaturated carboxylic monomer, a crosslinking agent and, optionally, an alkyl acrylate or methacrylate, which are characterized in that they are obtained by copolymerizing the following monomers in the indicated proportions by weight:

(a) from 50 to 95% of at least one unsaturated carboxylic monomer,
(b) from 5 to 25% of at least one ester of acrylic or methacrylic acid with a polyalkylene glycol having the general formula:

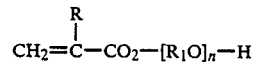

in which
R is H or $CH_3$,
$R_1$ is a divalent alkylene group containing from 2 to 6 carbon atoms inclusive, and
n is an integer from 2 to 25,
(c) from 0 to 20% of at least one ester of acrylic acid of the general formula

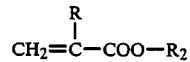

in which R is H or $CH_3$ and $R_2$ is a linear or branched alkyl group containing 4 to 20 carbon atoms, and
(d) from 0.1 to 5% of at least one crosslinking agent chosen from unsaturated monomers containing at least two vinyl end groups $CH_2=C<$.

The carboxylic copolymers of the present invention are polymers having molecular weights of more than about 1,000 up to several million, usually more than about 10,000 up to a million and more.

Monomers (a)

The unsaturated carboxylic monomers employed in the preparation of the polymers of the invention are olefinically unsaturated carboxylic acids containing at least one activated carbon-carbon double bond and at least one carboxyl group.

These acids contain an olefinic double bond which polymerizes readily because of its presence in the molecule either in an alpha,beta position relative to the carboxyl group, or in the form of a methylene end group such as $CH_2=C<$.

The olefinically unsaturated acids belonging to this class include acrylic acid, methacrylic acid, ethacrylic acid, crotonic acid, styrylacrylic acid, itaconic acid, maleic acid and fumaric acid. Acid anhydrides, such as maleic anhydride, are also included in the expression "carboxylic acid".

The preferred monomers of the invention are acrylic acid $CH_2=CH-COOH$ and methacrylic acid. Another monomer of interest is maleic anhydride. They may be employed separately or mixed together to form the polymers of the invention. They constitute from 50 to 95% by weight and preferably from 80 to 95% by weight of the polymer of the invention.

Monomers (b)

The esters of acrylic acid or of methacrylic acid and of a polyalkylene glycol which are employed in the present invention have the general formula:

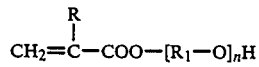

in which R is H or $CH_3$, $R_1$ is a divalent alkylene group such as ethylene [$-CH_2-CH_2-$], propylene 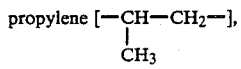, or tetramethylene (also called butylene) ($CH_2$—$CH_2$—$CH_2$—$CH_2$), and n an integer from 2 to 25 inclusive.

These esters are obtained by an esterification reaction of acrylic acid or of methacrylic acid with a polyalkylkene glycol such that a single hydroxyl group of the polyalkylene glycol reacts with the acid to form the acrylic or methacrylic monoester of polyalkylene glycol. The polyalkylene glycols which may be employed are, for example, diethylene glycol, triethylene glycol, tetraethylene glycol, polyethylene glycol of MW 400, polyethylene glycol of MW 1,000, dipropylene glycol, tripropylene glycol, polypropylene glycol of MW 200, polypropylene glycol of MW 400, polypropylene glycol of MW 1,000, polytetramethylene glycol of MW 650 and polytetramethylene glycol of MW 100 (MW=molecular weight). Since the list is not limiting, the polyalkylene glycols may be employed separately or mixed during the esterification reaction.

The esters may also be obtained by reaction of ethylene oxide, propylene oxide or butylene oxide or of a mixture of these, with acrylic acid or methacrylic acid, or else with a hydroxyalkyl acrylate or methacrylate of formula $$CH_2=\overset{R}{\underset{|}{C}}-COO-R_3-OH$$

in which R is H or $CH_3$, and $R_3$ is a divalent alkylene group such as $-\!\!+\!CH_2\!-\!CH_2\!+\!\!-$,

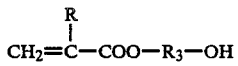

or $-\!\!+\!CH_2\!\!+\!\!_4$.

These methods of synthesis are known to the person skilled in the art and do not form part of the invention.

Monomers (b) which can be used in the invention are, for example, diethylene glycol monoacrylate, tetraethylene glycol monoacrylate, triethylene glycol monoacrylate, dipropylene glycol monoacrylate, tripropylene glycol monoacrylate, dibutylene glycol monoacrylate, diethylene glycol monomethacrylate, triethylene glycol monomethacrylate, tetraethylene glycol monomethacrylate, dipropylene glycol monomethacrylate, tripropylene glycol monomethacrylate, dibutylene glycol monomethacrylate, the monoacrylate of polyethylene glycol of MW 200, the monomethacrylate of polyethylene glycol of MW 200, the monoacrylate of polyethylene glycol of MW 400, the monomethacrylate of polyethylene glycol of MW 400, the monoacrylate of polyethylene glycol of MW 600, the monomethacrylate of polyethylene glycol of MW 600, the monoacrylate of polyethylene glycol of MW 1,000, the monomethacrylate of polyethylene glycol of MW 1,000, the monoacrylate of polypropylene glycol of MW 200, the monomethacrylate of polypropylene glycol of MW 200, the monoacrylate of polypropylene glycol of MW 400, the monomethacrylate of polypropylene glycol of MW 400, the monoacrylate of polypropylene glycol of MW 1,000, the monomethacrylate of polypropylene glycol of MW 1,000, the monoacrylate of polytetramethylene glycol of MW 650, the monoacrylate of polytetramethylene glycol of MW 1,000, the monomethacrylate of polytetramethylene glycol of MW 1,000, and the monomethacrylate of polytetramethylene glycol of MW 650.

These monomers may be employed separately or in mixture to form the polymers of the invention. They constitute from 5 to 25% by weight and preferably from 5 to 20% by weight of the polymer of the invention.

The preferred monomers of the invention are the monoacrylate of polyethylene glycol of MW 200, the monoacrylate of polypropylene glycol of MW 200, and the monomethacrylate of polypropylene glycol of MW 200.

Monomers (c)

These esters of acrylic acid or of methacrylic acid, which may be optionally employed in the polymers of the invention have the general formula:

$$CH_2=\overset{R}{\underset{|}{C}}-COO-R_2$$

in which
R is H or $CH_3$, and
$R_2$ is a linear or branched alkyl group containing 4 to 20 carbon atoms.

For certain applications, these acrylic or methacrylic esters may be incorporated in the carboxylic polymers of the invention. In this case, they are present in quantities of approximately 1 to 20% by weight and preferably from 5 to 15% by weight. Examples of monomers of this type are butyl acrylate, hexyl acrylate, heptyl acrylate, octyl acrylate, 2-ethylhexyl acrylate, lauryl acrylate, isodecyl acrylate, butyl methacrylate, isobutyl methacrylate, tert-butyl methacrylate, octyl methacrylate, heptyl methacrylate, hexyl methacrylate, isodecyl methacrylate, hexadecyl methacrylate, stearyl methacrylate and lauryl methacrylate.

These esters may be employed separately or in mixture to form the polymers of the invention.

The preferred monomers (c) of the invention are 2-ethylhexyl acrylate, lauryl acrylate and stearyl methacrylate.

Monomers (d)

The crosslinking agents (d) employed in the carboxylic polymers of the invention are monomers containing at least two vinyl end groups $CH_2=C<$, and they may be hydrocarbons, esters, nitriles, acids, ethers, ketones, alcohols and all polyunsaturated compounds containing at least two vinyl groups $CH_2=C<$. Nonlimiting examples of compounds which may be employed as crosslinking agents and corresponding to the above definition are divinylbenzene, divinylnaphthalene, butadiene, low molecular weight polybutadiene, isoprene, ethylene glycol diacrylate, ethylene glycol dimethacrylate, trimethylolpropane triacrylate, trimethylolpropane trimethacrylate, pentaerythritol triacrylate, pentaerythritol tetraacrylate, allyl methacrylate, allyl acrylate, methallyl acrylate, crotyl acrylate, allyl cinnamate, diallyl oxalate, diallyl phthalate, allyl maleate, diallyl maleate, diallyl and triallyl citrates, diallyl phosphate, triallyl phosphate, diallyl phosphite, triallyl phosphite, acrylic anhydride, methacrylic anhydride, divinyl ether, diallyl ether, dimethallyl ether, ethylene glycol diallyl ether, glycerol diallyl and triallyl ether, trimethylolpropane diallyl and triallyl ether, pentaerythritol triallyl and tetraallyl ether, sucrose polyallyl ether, hexaallyl trimethylene trisulphone, triallyl cyanurate, tetraallyloxyethane, tetraallyltin, tetravinylsilane, triacryloyltriazine, trimethacryloyltriazine, triallylamine, methylenebisacrylamide and divinyldioxane.

The crosslinking agents (d) are employed separately or in mixture to form the polymers of the invention in quantities of between 0.1 and 5% by weight and, preferably, in quantities of between 0.1 and 2% by weight. Particularly preferred crosslinking agents for the preparation of the carboxylic polymers of the invention are allyl methacrylate, triallyl phosphate, pentaerythritol triallyl ether, sucrose polyallyl ether, trimethylolpropane diallyl ether and tetraallyloxyethane.

Preparation of the polymers

The polymerization of the monomers a)-d) according to the invention is usually performed in the presence of a free radical catalyst in a closed and stirred reactor, under inert atmosphere, under autogenous pressure or under a pressure produced artificially, or else in an open and stirred reactor under inert atmosphere or in a refluxing solvent at atmospheric pressure, batchwise or with continuous addition of the reactants. The polymerization temperature is generally between 0° C. and 150° C. A temperature between 25° C. and 100° C. is usually employed for conducting polymerizations with a 90 to 100% yield.

The free radical catalysts generating free radicals which initiate polymerization are peroxide compounds such as, for example, benzoyl peroxide, lauroyl peroxide, capryl peroxide, acetyl peroxide, tert-butyl peroxide, pelargonyl peroxide, tert-butyl perbenzoate, di-tert-butyl perphthalate, di(2-ethylhexyl) peroxydicarbonate, sodium peracetate, ammonium persulphate, hydrogen peroxide and all products of this type. Other radical catalysts which can be used are azo compounds such as azobisisobutyronitrile, azobisisovaleronitrile and many others. They may be employed separately or in mixture to produce the carboxylated polymers of the invention.

The polymerization of the monomers according to the invention is carried out in an organic solvent in which the monomers are soluble, but in which the polymers are insoluble. Thus, during the polymerization, the polymers precipitate in the form of fine powder. It suffices to remove the solvent by filtration and evaporation to recover the carboxylic polymers. The solvents must be inert towards the monomers and the polymers. They are preferably aliphatic or aromatic hydrocarbons, but it is possible to employ any other solvent meeting the above requirements, such as halogenated hydrocarbons, esters, alcohols and others. All these solvents must have a boiling point between 25° and 150° C. in order to be capable of being removed fairly easily with a view to the recovery of the polymers.

As suitable solvents, there may be mentioned benzene, toluene, hexane, heptane, cyclohexane, carbon tetrachloride, methylene chloride, chloroform, tetrachloroethylene, trichloroethylene, trichloroethane, ethyl acetate, methyl acetate, methanol, ethanol, butanol, chlorofluoromethane, chlorofluoroethane, trichlorotrifluoroethane, and the like; the preferred solvents are benzene, ethyl acetate and methanol.

When the polymerization solvents employed are polar, such as esters or alcohols, it is furthermore possible to neutralize a part of the carboxylic monomers to avoid the polymers being swollen by the solvents and to avoid gel formation. The neutralization is carried out using bases such as sodium hydroxide, potassium hydroxide, sodium carbonate, aqueous ammonia and certain amines such as morpholine, monoethanolamine and the like. The neutralization of the carboxylic monomers is performed before the polymerization and may involve from 1 to 50% of the carboxylic groups employed. This neutralization is preferably carried out without the addition of water.

The concentration of the monomers in the polymerization solvent may vary from 5 to 35% and preferably from 10 to 25% so that the polymerization temperature can be controlled and that the polymers obtained are free from agglomerates. At higher concentrations the polymerization reaction is strongly exothermic, with the result that it is difficult to maintain the chosen polymerization temperature. It is, in fact, of prime importance to control the polymerization temperature in order to produce polymers having the desired molecular weight.

Properties and uses

In water, the crosslinked carboxylic copolymers of the invention form clear gels which are pourable or solid, depending on the quantity of water employed. In water, thickening is obtained as soon as the carboxylic polymers dissolve at pH 2-3, but it is greatly increased when the carboxylic groups in the polymers are neutralized, the optimum being obtained at pH values of 7 to 9. Neutralizing bases which may be employed are aqueous ammonia, sodium hydroxide, potassium hydroxide, sodium carbonate and amines such as monoethanolamine, diethanolamine, monoethylamine and the like. It is also possible to thicken hydroalcoholic media or other media containing solvents by neutralizing the carboxylic polymers of the invention using primary, secondary or tertiary amines.

The carboxylic copolymers according to the invention are particularly effective when the medium to be thickened contains dissolved salts, especially sodium chloride, when compared with other polymers which are already known. The well-known salt effect results in a lowering of the thickening properties of the previously known carboxylic polymers. This salt effect is less pronounced with the carboxylated polymers according to the invention, particularly by virtue of the presence in the polymers of the invention of the polyalkylene glycol chains contributed by the polyalkylene glycol acrylate or methacrylate esters defined above.

The carboxylic copolymers of the invention are effective in thickening aqueous media from 0.1% by weight of polymer relative to the medium to be thickened. Commonly employed dosages are between 0.1% and 2%.

The carboxylic copolymers of the invention may, for example, be employed as thickeners in printing pastes for textiles, for the preparation of cosmetics and of pharmaceutical compositions, for ore treatment, in fire-extinguishing materials, in papercoating baths, for oil extraction, and many other applications.

The invention is described still more completely by the following examples which do not imply any limitation and which are given by way of illustration.

EXAMPLE I 350 g of benzene are charged into a reaction vessel fitted with a thermometer, a stirrer and a reflux condenser, and are heated to 80° C. under reflux, after having been purged with nitrogen.

A mixture consisting of 550 g of benzene, 188.5 g of acrylic acid, 10 g of acrylate of polypropylene glycol of MW 200 (PPG 200 acrylate), 1.5 g of allyl methacrylate and 0.2 g of azobisisobutyronitrile (AIBN) is prepared in a dropping funnel. After dissolving and being purged with nitrogen, the mixture is introduced over 3 h into the reactor containing the refluxing benzene (a temperature of approximately 80° C.) The mixture is then maintained at 80° C. for 4 hours and is cooled. A white precipitate has appeared in the reactor during the reaction. A suspension of approximately 18% of polymer in benzene is obtained at the end of the reaction. This polymer is then isolated by filtration and is dried. The polymerization yield is 98%. The composition of the carboxylic polymer obtained is: acrylic acid 94.25%, PPG 200 acrylate 5% and allyl methacrylate 0.75%, by weight.

Samples of this polymer are dissolved in water at concentrations of 1 and 0.5% by weight and are neutralized with aqueous ammonia to a pH of about 7.

The viscosities of the solutions produced in this manner, measured in a Brookfield RVT viscometer at 10 revolutions/minute, are 145,000 centipoises and 74,000 centipoises, respectively.

A sample of this polymer is dissolved in saline water containing 1% of sodium chloride at a concentration of 1% by weight and are neutralized to a pH of about 8 with aqueous ammonia. The viscosity of this solution, measured in a Brookfield viscometer at 10 revolutions/minute, is 15,000 centipoises.

By way of comparison, a polymer prepared under identical conditions but without the PPG 200 acrylate, whose composition is: acrylic acid 99.25% and allyl methacrylate 0.75% by weight, representative of the polymers of the prior art, is employed. The aqueous solutions prepared under the same conditions as above, have viscosities of 160,000 centipoises at 1%, 80,000 centipoises at 0.5% and 300 centipoises at 1% in 1% strength saline water.

EXAMPLE II

A reaction vessel fitted with a thermometer, a stirrer and a reflux condenser is charged with 1,100 g of ethyl acetate, 180 g of acrylic acid, 20 g of acrylate of polypropylene glycol of MW 200 (PPG 200 acrylate), 10 g of potassium carbonate, 0.5 g of allyl methacrylate and 0.2 of azobisisobutyronitrile (AIBN). After the potassium carbonate has dissolved, the mixture is heated under reflux for 4 hours. A white precipitate forms at the end of 4 h, another 0.1 g of AIBN is added and refluxing is continued for another 2 h. After cooling, the polymer is in the form of a fine suspension in the solvent, at a concentration of approximately 15% of polymer. The polymer is isolated and dried. The polymerization yield is approximately 97.5%. The composition of the carboxylic polymer is: 89.75% of acrylic acid, 10% of PPG 200 acrylate and 0.25% of crosslinking agent, by weight.

The viscosities of the solutions at concentrations of 1% and 0.5% in water and at a concentration of 1% in water containing 1% of NaCl, after neutralization to a pH ~ 8 with aqueous ammonia, are 62,000 centipoises, 38,500 centipoises and 4,950 centipoises respectively, as measured in a Brookfield viscometer at a speed of 10 revolutions/minute.

EXAMPLE III

A reaction vessel fitted with a reflux condenser, a thermometer and a stirrer is charged with 280 g of methanol, which is heated to reflux. A mixture made up of 200 g of methanol, 95 g of acrylic acid, 47 g of potassium hydroxide flake, 5 g of acrylate of polyethylene glycol of MW 400 (PEG 400 acrylate), 1 g of allyl methacrylate and 0.15 g of AIBN is prepared in a dropping funnel. After the potassium hydroxide has dissolved in the mixture, 80 ml of the mixture are poured into the reactor at reflux. The reaction begins and a white precipitate appears. The remainder of the mixture is then added over 3 h to the reactor which is at reflux temperature. 0.1 g of AIBN is then added and the reaction is allowed to continue for another 4 hours. After cooling, a polymer suspension is obtained in the form of fine powder in methanol at a concentration of approximately 20% of polymer. The polymer is isolated and dried. The polymerization yield is approximately 98%. The composition of the carboxylic polymer obtained is, on a weight basis: 94% of acrylic acid, 5% of PEG 400 acrylate and 1% of allyl methacrylate.

The viscosities of the solutions at concentrations of 1% and 0.5% in water and at 1% in water containing 1% of NaCl, after neutralization with aqueous ammonia to a pH of about 8, are 95,000 centipoises, 35,000 centipoises and 1,700 centipoises respectively, as measured in a Brookfield viscometer at a speed of 10 revolutions/minute.

EXAMPLE IV

A mixture of monomers comprising 180 g of acrylic acid, 1.5 g of pentaerythritol triallyl ether, 10 g of stearyl methacrylate, 10 g of potassium carbonate, 10 g of methacrylate of polytetramethylene glycol of MW 650 (PolyTHF 650 methacrylate) and 0.2 g of AIBN is polymerized under the conditions described in Example II.

The viscosities of the solutions at concentrations of 1% and 0.5% in water and at 1% in water containing 1% of NaCl, after neutralization with aqueous ammonia to a pH of about 8, are 120,000 centipoises, 70,000 centipoises and 5,500 centipoises respectively.

EXAMPLE V

A series of monomer mixtures is polymerized under the conditions described in Examples I, II or III. Table I shows the various quantities of monomers employed.

Table II shows the viscosities produced by dissolving the various polymers obtained in this manner at concentrations of 1% and 0.5% in water and at a concentration of 1% in water containing 1% of NaCl, after neutralization with NH4OH to a pH of about 8.

TABLE I

| Monomers | Tests | | | | | | | |
|---|---|---|---|---|---|---|---|---|
| | 1 | 2 | 3 | 4 | 5 | 6 | 7 | 8 |
| *Acrylic acid | 190 | 160 | 180 | 180 | 180 | 170 | 180 | 155 |
| *DEG acrylate | 10 | — | — | — | — | — | — | — |
| *PEG 1000 acrylate | — | — | 20 | — | — | — | — | — |
| *PPG 200 methacrylate | — | 40 | — | — | 10 | 10 | 20 | 10 |
| *PPG 1000 methacrylate | — | — | — | 20 | — | — | — | — |
| *2-EH acrylate | — | — | — | — | 10 | — | — | — |

TABLE I-continued

| Monomers | 1 | 2 | 3 | 4 | 5 | 6 | 7 | 8 |
|---|---|---|---|---|---|---|---|---|
| Stearyl methacrylate | — | — | — | — | — | 20 | — | 35 |
| Allyl methacrylate | 1 | 1.5 | 1 | — | — | 1 | — | 1.5 |
| *PE allyl ether | — | — | — | 1.5 | — | — | — | — |
| Sucrose allyl ether | — | — | — | — | 2.2 | — | — | — |
| *TMP diallyl ether | — | — | — | — | — | — | 1.5 | — |
| AIBN | 0.2 | 0.2 | 0.2 | 0.2 | — | 0.2 | 0.25 | 0.25 |
| Lauroyl peroxide | — | — | — | — | 0.3 | — | — | — |
| *Medium | Bz | Bz | EAc | EAc | Bz | EAc | Bz | Bz |

*DEG acrylate = Diethylene glycol monoacrylate
PEG 1000 acrylate = Monoacrylate of polyethylene glycol MW 1000
PPG 200 methacrylate = Monomethacrylate of polypropylene glycol MW 200
PPG 1000 methacrylate = Monomethacrylate of polypropylene MW 1000
2-EH acrylate = 2-Ethylhexyl acrylate
PE allyl ether = Pentaerythritol triallyl ether
TMP diallyl ether = Trimethylolpropane diallyl ether
AIBN = Azobisisobutyronitrile
Bz = Benzene
EAc = Ethyl acetate

TABLE II

| | 1 | 2 | 3 | 4 | 5 | 6 | 7 | 8 |
|---|---|---|---|---|---|---|---|---|
| 1% in water | 67,500 | 110,000 | 72,000 | 105,000 | 125,000 | 175,000 | 98,500 | 85,000 |
| 0.5% in water | 41,400 | 35,500 | 38,000 | 43,000 | 55,000 | 78,000 | 36,500 | 25,000 |
| 1% in H$_2$O + NaCl | 4,500 | 5,500 | 95,000 | 7,500 | 6,500 | 10,500 | 9,650 | 3,500 |

The viscosities are measured in a Brookfield viscometer at a speed of 10 revolutions/minute

I claim:

1. Crosslinked carboxylic colpolymers obtained by copolymerizing the following monomers in the indicated proportions by weight:
   (a) from 50 to 95% of at least one olefinically unsaturated carboxylic acid monomer,
   (b) from 5 to 25% of at least one ester of acrylic or methacrylic acid with a polyalkylene glycol having the general formula:

$$CH_2=\overset{R}{\underset{|}{C}}-CO_2-[R_1O]_n-H$$

in which
   R is H or CH$_3$,
   R$_1$ is a divalent alkylene group containing from 2 to 6 carbon atoms inclusive, and
   n is an integer from 2 to 25, and
   (c) from 0.1 to 5% of at least one crosslinking agent chosen from unsaturated monomers containing at least two vinyl end groups CH$_2$=C<; as well as the products obtained by neutralizing at least partially said copolymers with an organic or inorganic base.

2. Copolymers according to claim 1, wherein the copolymerized monomers further comprise
   (d) up to 20% of at least one acrylic acid ester of the general formula:

$$CH_2=\overset{R}{\underset{|}{C}}-COO-R_2$$

in which R is H or CH$_3$ and R$_2$ is a linear or branched alkyl group containing 4 to 20 carbon atoms.

3. Copolymers according to claim 2, wherein the monomer (d) is chosen from 2-ethylhexyl acrylate and stearyl methacrylate.

4. Copolymers according to claim 1, wherein the unsaturated carboxylic monomer (a) is chosen from acrylic acid, methacrylic acid and maleic anhydride.

5. Copolymers according to claim 1, wherein the monomer (b) is chosen from diethylene glycol monoacrylate, the monocrylate of polyethylene glycol of MW 200, the monoacrylate of polyethylene glycol of MW 1000, the monoacrylate of polyethylene glycol of MW 200, the monomethacrylate of polyethylene glycol of MW 200, the monomethacrylate of polyethylene glycol of MW 1000, and the monomethacrylate of polytetramethylene glycol of MW 650.

6. Copolymers according to claim 1, wherein the crosslinking agent (c) is chosen from allyl methacrylate, trimethylolpropane diallyl ether, pentaerythritol triallyl ether and sucrose polyallyl ether.

7. Process for preparing a crosslinked carboxylic copolymer, which comprises copolymerizing the following monomers in the indicated proportions by weight:
   (a) from 50 to 75% of at least one olefinically unsaturated carboxylic acid monomer,
   (b) from 5 to 25% of at least one ester of acrylic or methacrylic acid with a polyalkylene glycol having the general formula:

$$CH_2=\overset{R}{\underset{|}{C}}-CO_2-[R_1O]_n-H$$

in which
   R is H or CH$_3$,
   R$_1$ is a divalent alkylene group containing from 2 to 6 carbon atoms inclusive, and
   n is an integer from 2 to 25,
   (c) from 0.1 to 5% of at least one crosslinking agent chosen from unsaturated monomers containing at least two vinyl end groups CH$_2$=C<; in an inert solvent in which the monomers are soluble and the copolymers are insoluble.

8. Process according to claim 7, including copolymerzing (d) up to 20% of at least one acrylic acid ester of the general formula:

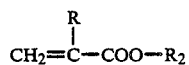

in which R is H or $CH_3$ and $R_2$ is a linear or branched alkyl group containing 4 to 20 carbon atoms.

9. Process according to claim 8, which further comprises the step of partially neutralizing the monomer (a) with an organic or inorganic base before copolymerizing.

10. Process according to claim 8, which further comprises the step of at least partially neutralizing the resultant copolymer with an organic or inorganic base.

11. Process according to claim 7, wherein benzene, ethyl acetate or methanol is employed as a solvent.

12. Process according to claim 7, wherein the polymerization is carried out at a temperature between 25° and 100° C. and with the aid of an organic catalyst.

13. Process according to claim 12, wherein the catalyst is chosen from azobisisobutyronitrile, lauroyl peroxide and benzoyl peroxide.

14. Process according to claim 7, which further comprises the step of partially neutralizing the monomer (a) with an organic or inorganic base before copolymerizing.

15. Process according to claim 7, which further comprises the step of at least partially neutralizing the resultant copolymer with an organic or inorganic base.

* * * * *